Dec. 3, 1929.  W. C. TUNNO  1,737,742
WHEEL RIM
Filed Dec. 12, 1927    2 Sheets-Sheet 1
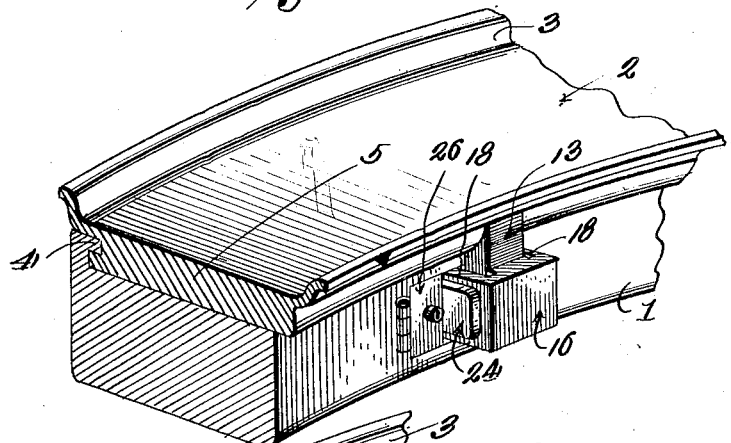
Fig.1.
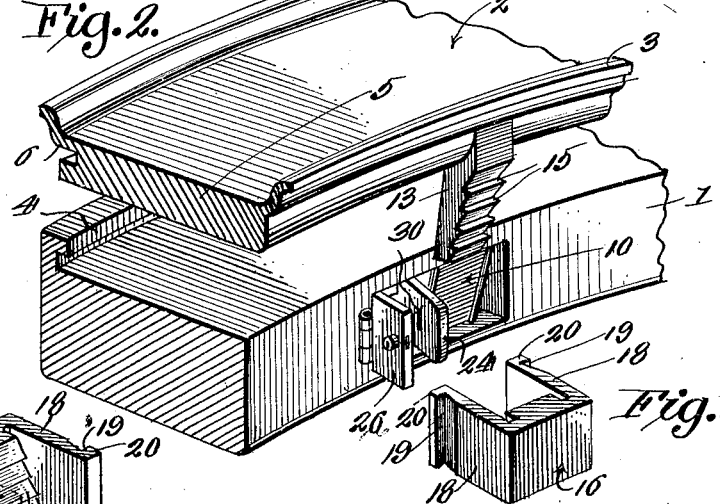
Fig.2.
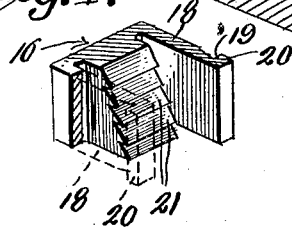
Fig.4.
Fig.3.
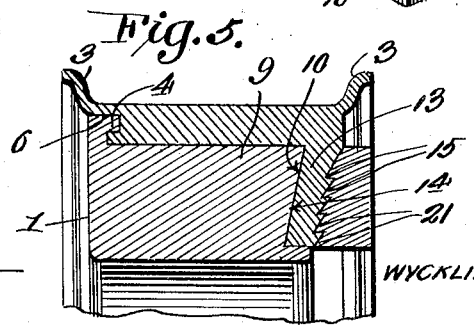
Fig.5.
WITNESSES
Inventor
WYCKLIFFE C. TUNNO
By Irving L. McEathran
Attorney Dec. 3, 1929.   W. C. TUNNO   1,737,742
WHEEL RIM
Filed Dec. 12, 1927    2 Sheets-Sheet 2
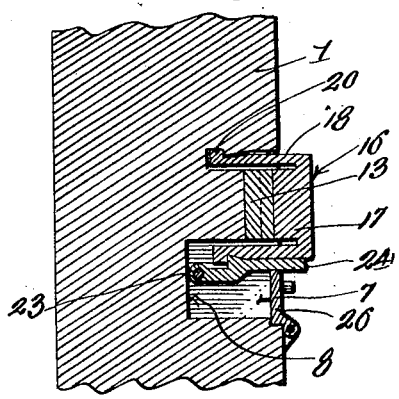
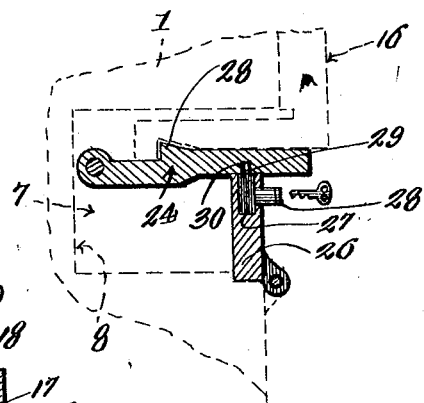
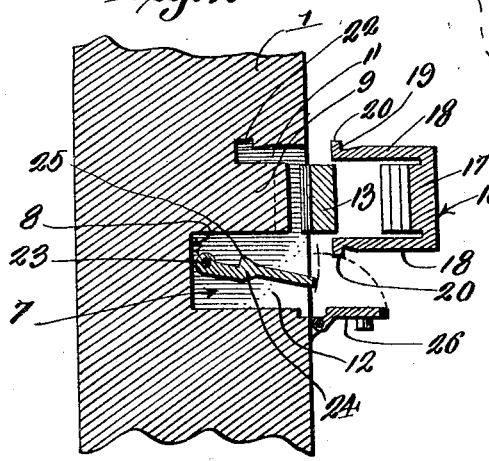
WITNESSES
Inventor
WYCKLIFFE C. TUNNO Patented Dec. 3, 1929

1,737,742

UNITED STATES PATENT OFFICE

WYCKLIFFE C. TUNNO, OF SAVANNAH, GEORGIA

WHEEL RIM

Application filed December 12, 1927. Serial No. 239,535.

This invention relates to vehicle rims and wheels and pertains particularly to a demountable rim and structure for securing the same in position.

The primary object of the present invention is to provide a vehicle wheel and rim designed to be locked together to prevent the unauthorized removal of the rim from the wheel.

A further object of the invention is to provide a new and novel locking device designed particularly for securing a vehicle wheel rim upon the wheel felly.

The invention will be best understood from a consideration of the following detailed description taken in connection with the accompanying drawings forming a part of the present specification, with the understanding, however, that the invention is not confined to any strict conformity with the showing of the drawings, but may be changed or modified so long as such changes or modifications mark no material departure from the salient features of the invention as expressed in the appended claims.

In the drawings:—

Figure 1 shows a portion of a wheel felly and a portion of a rim locked thereto by the locking device embodying the present invention.

Figure 2 shows the rim and felly sections in separated relation showing the manner in which the locking device on the felly opens to release the associate member on the rim.

Figure 3 is a detailed perspective view of the locking key employed.

Figure 4 is a further detailed perspective view of the locking or coupling key looking into the face of the same.

Figure 5 is a section taken transversely of the felly and rim through the center of the locking elements.

Figure 6 is a horizontal section through the locking elements in the felly rim.

Figure 7 is a view similar to Figure 6 but showing the locking elements separated.

Figure 8 is an enlarged sectional view through the pivoted catch and lock which is carried by the wheel felly.

Referring now to the drawings in detail wherein like numerals of reference indicate corresponding parts throughout the several views, the numeral 1 indicates a portion of a vehicle wheel felly of the type usually used for pneumatic tire wheels and carrying thereon the pneumatic tire carrying rim 2. As shown, this rim is of the straight side type having the upwardly and outwardly curving circumferentially extending flanges 3.

The wheel felly with which the present rim structure and locking means is used has formed about the periphery thereof at the inner side the inturned flange 4. As is shown, the body of the rim used in association with the present device is relatively thick as indicated at 5 and this bottom portion is undercut at one side or edge adjacent one flange 3, as indicated at 6, to receive the flange 4 of the felly when the rim is slipped thereon, in the manner clearly shown in Fig. 1.

The outer face of the felly 1, opposite the face adjacent which the flange 4 is formed, is provided with a plurality of pockets 7. The back wall 8 of each of the pockets 7 has projecting therefrom and toward the open side of the pocket an abutment 9, the outer face of which abutment is undercut as indicated at 10 and clearly shown in Fig. 5. It will also be seen upon reference to Figures 6 and 7, that the abutment 9 is not directly in the center of the pocket 7 but is positioned relatively close to one side wall thereof thereby setting up the shallow recess 11 upon one side of the abutment and the relatively wide recess 12 upon the opposite side. It will also be seen that the abutment does not project through the outer edge of the pocket.

Secured to the rim 2 at that side opposite the side in which the groove or undercut portion 6 is formed, is a plurality of radially directed inwardly extending lugs 13. The back wall 14 of each of the lugs is inclined to correspond to the inclination of the outer face 10 of the abutment 9, to fit snugly thereagainst when the rim is in position upon the wheel felly, as is shown in Fig. 5. The outer face of each lug 13 is provided with a plurality of outwardly directed teeth 15 which are engaged by a coupling key hereinafter described. As is shown in Fig. 5, the rim lug 13 has its outer face in which the teeth 15 are formed bent at an angle the same as the inner or rear face of the lug.

When the rim 2 is in position upon the felly wheel, each lug 13 will have its rear face abutting the forward face of an abutment 9 and there is then placed in position the coupling key which is indicated as a whole by the numeral 16. As shown, this coupling key 16 is of U-shaped cross-sectional design having the back or yoke portion 17 and the right-angularly directed alined legs 18. The free end of each leg 18 has a transverse notch 19 formed across its outer face which forms a catch 20. The coupling key 16 is extended into a pocket 7 to straddle the lug 13 and the abutment 9 against which the lug is positioned, one of the lugs 18 extending into the pocket recess 11, the other extending into the recess 12. The inner face of the yoke portion 17 of the locking key is formed at an angle with respect to the outer face thereof and is formed to provide the engaging teeth 21 which are directed opposite to the teeth 15 upon the adjacent lugs 13 with which they are designed to engage.

As is clearly shown in Figs. 6 and 7, the side wall of the recess 11 is provided with a shallow pocket for the reception of the hook or catch 20 of the coupling key leg which is extended thereinto, the recess being of sufficient width to permit the extension of the catch 20 which projects slightly beyond the face of the leg upon which it is formed, the catch being engaged in the recess 22 by moving the entire coupling key laterally after being projected as far as possible into the pocket 7.

Mounted upon the pivot pin 23 which is positioned in the rear of the recess 12 of each pocket and which extends radially of the wheel, is a swinging latch plate 24.

The pivoted latch plate 24 has a tongue 25 formed across the face nearest the abutment 9, which tongue is designed to engage the catch 20 on the other leg 18 of the coupling key device when the key is in the position shown in Fig. 6.

Pivotally attached to the side wall of the recess 12 at the outer edge thereof is a locking jaw indicated as a whole by the numeral 26 which jaw carries or has morticed therein the lock 27 which when actuated by the insertion of a key in the barrel 28 which projects through the face of the jaw, causes a pin 29 to be extended from the forward edge of the door into an aperture 30 in the adjacent face of the pivoted latch plate 24. When the jaw 26 is in locking engagement with the latch plate 24 it is flush with the side face of the felly 1 as shown in Figure 6. The latch plate 24 lies against or parallel with the outer face of the adjacent coupling key ledge 18 as also clearly shown in this figure. In Fig. 8 an enlarged detail view is shown of the pivoted locking plate 24 and the door 26, showing the manner in which these members connect together to prevent the removal of the coupling key 16. It will be clearly seen that when the coupling key 16 is locked in position, the teeth 21 thereof engage the teeth 15 of a lug 13 and prevent any movement of the rim on the felly.

From the foregoing description, it will be readily seen that when the rim 2 is placed upon the wheel felly, the flange 4 of the felly will first lock in the groove 6 of the rim and at the same time the lugs 13 will, when properly alined, engage in a pocket 7 against the outer face of an abutment 9. A coupling key 16 is then inserted into each pocket, as shown in Fig. 6, the pivoted latch plate adjacent each key swung to position parallel with the adjacent key leg 18 and the locking door swung to closed position to permit the pin 29 to be projected into the aperture 30 of the locking plate 24. It will be readily seen from this that the tire cannot be readily removed from the wheel felly except by deflation and the use of tools, which process is rather lengthy and would therefore not be attempted by a person attempting to steal the tire. The present method of securing the rim to the felly also has an advantage over the usual method of employing nuts and bolts in that there is nothing there to work loose and cause the trouble whereas in the use of nuts and bolts, the nuts frequently work loose and allow the wheel rim to become loose upon the wheel.

Having thus described my invention, what I claim is:—

1. A wheel rim lock of the character described, including a rim and wheel felly therefor comprising a lug carried by the rim and extensible into a pocket in the felly when the rim is positioned thereon, a substantially U-shaped coupling key designed to straddle said lug to position the ends of the legs thereon in said pocket, and means for locking a leg of said coupling key with the wheel felly.

2. A tire rim lock comprising, in combination with a rim and a wheel felly to receive the same. a lug member carried by the rim and extending radially thereof to position in a pocket in the felly when the rim is in position thereon, a coupling key of substantially U-shaped cross-sectional design and adapted to straddle said lug to position the free ends of the legs thereon in said pocket, means for connecting one of said legs with the wheel felly, a swinging latch plate within the pocket for engaging the other leg of said key, and a swinging locking element carried by the felly for engagement with said latching plate to maintain the plate in position.

3. A device for locking a rim to a wheel felly, comprising a lug carried by the rim, a U-shaped coupling member embracing the lug, and means for locking the coupling member to the felly.

4. A device for locking a rim to a wheel felly, comprising a lug carried by the rim, a U-shaped coupling member embracing the lug, and removably engaged with the felly, and means for locking the coupling member in engagement with the felly.

5. A device for locking a rim to a wheel felly, comprising a lug carried by the rim and provided with teeth, a coupling member associated with the lug and provided with teeth engaging the teeth of the lug, and means for locking the coupling member to the felly.

6. A device for locking a rim to a wheel felly, comprising a lug carried by the rim, a coupling member associated with the lug and removably engaged with the rim, a latch member carried by the felly and engaging the coupling member, and means for locking the latch member in engagement with the coupling member.

In testimony whereof I affix my signature.

WYCKLIFFE C. TUNNO.